(12) United States Patent
Yamaguchi et al.

(10) Patent No.: US 7,677,651 B2
(45) Date of Patent: Mar. 16, 2010

(54) REAR VEHICLE BODY STRUCTURE

(75) Inventors: Toshizumi Yamaguchi, Wako (JP); Hiro Nushii, Wako (JP); Takumi Tsuyuzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/361,789

(22) Filed: Jan. 29, 2009

(65) Prior Publication Data

US 2009/0195032 A1 Aug. 6, 2009

(30) Foreign Application Priority Data

Jan. 31, 2008 (JP) ............................... 2008-020135

(51) Int. Cl.
*B62D 25/20* (2006.01)
(52) U.S. Cl. ............. 296/203.04; 296/37.2; 296/187.11
(58) Field of Classification Search ................ 296/37.2, 296/37.3, 187.11, 203.01, 203.04; 280/784, 280/785
See application file for complete search history.

(56) References Cited

U.S. PATENT DOCUMENTS

| 6,929,315 | B2 * | 8/2005 | Kim ........................... 296/204 |
| 7,540,559 | B2 * | 6/2009 | Egawa et al. ........... 296/203.04 |
| 2002/0190495 | A1 * | 12/2002 | Hamada et al. ....... 280/124.166 |

FOREIGN PATENT DOCUMENTS

| JP | 2004-314673 | 11/2004 |
| JP | 3620288 | 2/2005 |
| JP | 2006-193046 | 7/2006 |

* cited by examiner

*Primary Examiner*—Dennis H Pedder
*Assistant Examiner*—Pinel E Romain
(74) *Attorney, Agent, or Firm*—Rankin, Hill & Clark LLP

(57) ABSTRACT

In a rear vehicle body structure for a vehicle using a torsion beam suspension system, a laterally extending slot is defined between a vertical front wall of a spare tire pan defined in a rear floor panel and a raised rear end of a front floor panel and a torsion beam of the torsion beam suspension system is received in this slot. The spare tire is received in the spare tire pan in a rear end up slanted orientation. A rear end cross member extends across the vehicle in a rear end of the spare tire pan. In a rear end collision, the spare tire pan is pushed forward by the rear end cross member. The rear end cross member enables the impact load to be evenly distributed to the spare tire pan or the rear floor panel.

3 Claims, 4 Drawing Sheets

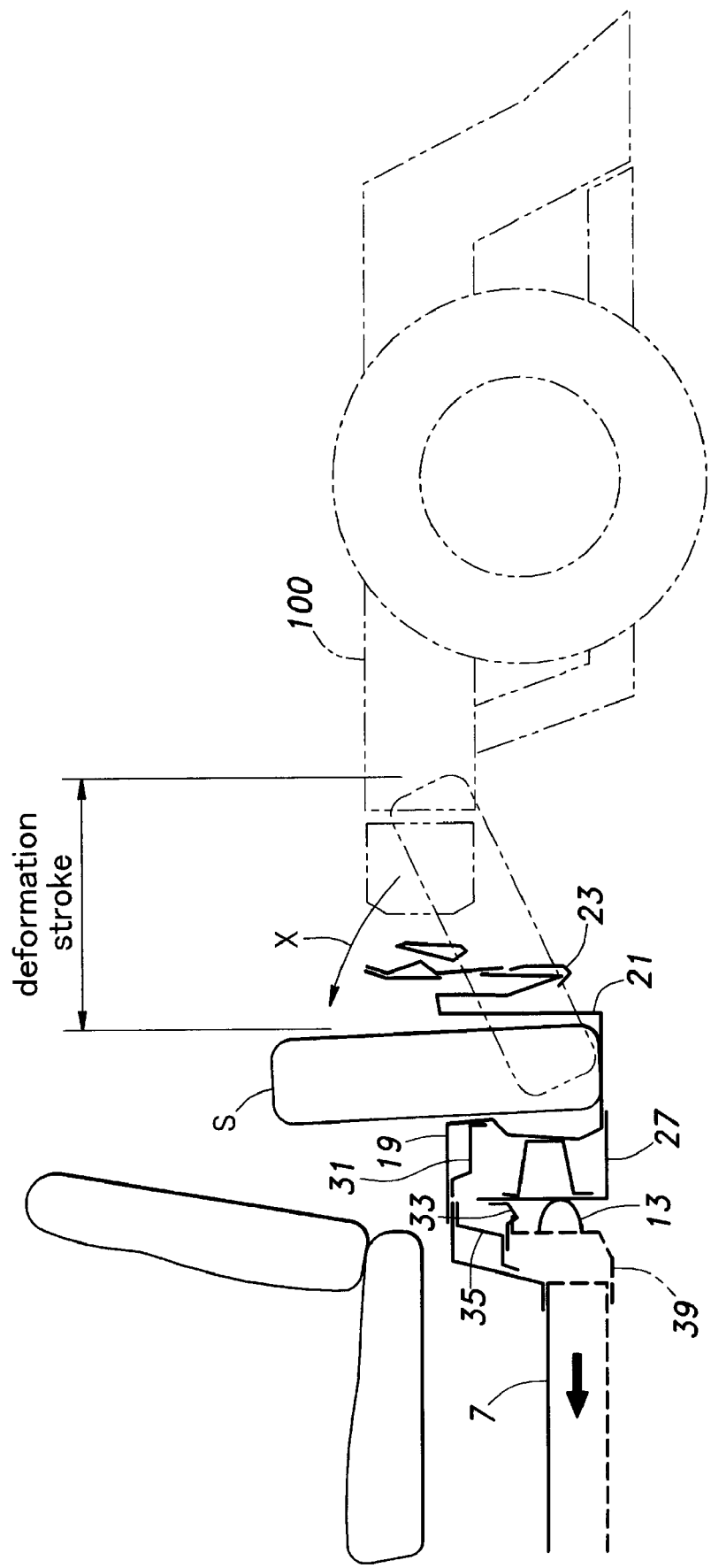

REAR VEHICLE BODY STRUCTURE

TECHNICAL FIELD

The present invention relates to a rear vehicle body structure configured to mount a torsion beam type wheel suspension system, and in particular to a rear vehicle body structure which is favorably reinforced against a rear end collision.

BACKGROUND OF THE INVENTION

There have been proposed a number of rear vehicle body structures that are reinforced against a rear end collision. In the rear vehicle body structure disclosed in Japanese patent No. 3620288, a deformation resisting portion having a relatively high rigidity is formed by a pair of rear side members, a suspension supporting cross member, a cross member for retaining a rear seat bottom and a rear floor panel, and a deformation permitting portion having a relatively low rigidity is formed between the deformation resisting portion and a spare tire pan for receiving a spare tire. Thereby, the impact of a rear end collision is made to cause a deformation of the deformation permitting portion in such a manner that the rear end of the spare tire pan may be dropped downward at the time of a rear end collision. Additionally, the suspension supporting cross member is placed so as to engage a front end of the spare tire pan when the rear vehicle body is subjected to an impact of a rear end collision.

In the rear vehicle body structure disclosed in Japanese patent laid open publication (kokai) No. 2004-314673, a spare tire pan is slanted with the forward end down, and a front vertical wall of the spare tire pan is connected to a horizontal front floor panel. A slanted upright wall member is connected between the front floor panel and front vertical wall so as to form a closed cross section along the junction between front floor panel and front vertical wall. Thereby, the reinforced front vertical wall of the spare tire pan is given with an increased rigidity so as to protect a fuel tank located ahead of the front vertical wall against the impact of a rear end collision without unduly reducing the space available for the fuel tank.

In the example disclosed in Japanese patent laid open publication (kokai) No. 2006-193046, a spare tire is received horizontally in a spare tire pan defined by recessing a part of a rear floor panel, and the spare tire pan is reinforced by a longitudinal member attached to the lower surface of the rear floor panel. The rear end of the longitudinal member is spaced from a vertical wall of a rear end panel. According to this arrangement, when an impact is received from the rear, the spare tire is prevented from being dislodged, and caused to be tilted so as to effectively absorb the impact.

These prior inventions have various shortcomings. If the rear vehicle body structure is configured to drop the rear end of a spare tire at the time of a rear end collision as proposed in Japanese patent No. 3620288, the deformation of the spare tire pan cannot be effectively utilized for the absorption of the impact energy of a rear end collision, and this limits the capability of the rear vehicle body to effectively absorb the impact energy at the time of a rear end collision.

According to the invention disclosed in Japanese patent laid open publication (kokai) No. 2004-314673, the rear end of the spare tire pan is raised without fail upon receiving the impact of a rear end collision. However, because the front vertical wall of the spare tire pan hangs over the front part of the spare tire, the spare tire is caught by this overhang as the rear end thereof is raised due to the impact of a rear end collision, and the rear end of the spare tire can be raised only to a limited extent. Therefore, the deformation stroke of the rear vehicle body is limited by such a behavior of the spare tire at the time of a rear end collision. Also, because of the absence of a cross member that connects the rear frames with each other, the impact of an offset rear end collision is not favorably distributed to the rear vehicle body.

According to the invention disclosed in Japanese patent laid open publication (kokai) No. 2006-193046, the spare tire is disposed horizontally and is fixedly secured to the floor panel, and the spare tire may be raised at the time of a rear end collision but only to a limited extent because a reinforcement member resists the rising movement of the spare tire. As a result, the deformation stroke at the time of a rear end collision is limited. Because of the absence of a cross member that connects rear parts of rear frames, the impact of an offset rear end collision is not favorably distributed to the rear vehicle body. These problems are particularly acute in the case of a hatchback passenger vehicle which does not have a bulkhead separating a passenger compartment from a luggage compartment, and has rear seats located relatively close to the rear end of the vehicle body.

These problems may be alleviated by increasing the mechanical strength of the rear side frames, but the rear side frames are capable of supporting loading that is applied to a limited region of the vehicle body, and may not be adequately able to support the load of a rear end collision depending on the way the rear end collision occurs. The forward movement of the spare tire at the time of a rear end collision may be avoided by increasing the mechanical strength of rear seats, but it has the drawback of unduly increasing the weight of the vehicle.

BRIEF SUMMARY OF THE INVENTION

In view of such problems of the prior art, a primary object of the present invention is to provide a rear vehicle body structure which provides a large deformation stroke at the time of a rear end collision.

A second object of the present invention is to provide a rear vehicle body structure which is able to withstand a rear end collision by a taller vehicle.

A third object of the present invention is to provide a rear vehicle body structure which can favorably distribute an impact load caused by a rear end collision.

According to the present invention, such an object can be accomplished by providing a rear vehicle body structure for a vehicle using a torsion beam suspension system comprising, a pair of rear side frames extending longitudinally in a rear end of a vehicle body, a rear floor panel attached to the rear side frames and including a spare tire pan defining a recess for receiving a spare tire in a rear end up slanted orientation. The spare tire pan including a vertical front wall. The rear vehicle body structure further comprising a rear end cross member extending laterally between the rear side frames and attached to a rear part of the spare tire pan, and a front floor panel defining a floor of a passenger compartment, and provided with a raised rear end connected to an upper end of the vertical front wall of the spare tire pan so that a laterally extending slot is defined between the vertical front wall and raised rear end of the front floor panel. The slot receives a torsion beam of the torsion beam suspension system.

According to this arrangement, at the time of a rear end collision, the spare tire pan is pushed forward by the rear end cross member. The rear end cross member enables the impact load to be evenly distributed to the spare tire pan or the rear floor panel. Because the spare tire is stored in a slanted orientation, such an impact causes the spare tire to be raised at the rear end while the spare tire pan undergoes a buckling or other compressive deformation. Thereby, the rear vehicle body structure provides a significant deformation stroke at the time of a rear end collision, and this increases the capability of the rear vehicle body to absorb impact energy. This is particularly beneficial for a hatchback passenger vehicle in which the passenger compartment directly communicates with the luggage compartment in the rear, and the rear seats are located at a short distance from the rear end of the vehicle body.

Furthermore, the spare tire can be raised into an upright posture in a reliable manner at the time of a rear end collision, and this prevents the intrusion of the spare tire into the passenger compartment and protects the rear seats from the impact even when the subject vehicle is hit from behind by a tall vehicle.

Because the torsion beam of the suspension system is received in the slot formed in the floor of the vehicle body, the torsion beam is effectively utilized for reinforcing the rear vehicle body against the impact of the rear end collision, and this increases the compression stroke and hence the energy absorbing capability of the rear vehicle body. This effect is particularly enhanced if a spare tire bumper is attached to a front side of the vertical front wall of the spare tire pan centrally with respect to the spare tire. Such a spare tire bumper may comprise a stamp formed sheet member including a main part extending substantially in parallel with the vertical front wall of the spare tire pan and at least one leg that connects the main part to the vertical front wall. Preferably, the spare tire bumper is vertically positioned and dimensioned so as to oppose the torsion beam over an entire vertical stroke of the torsion beam whereby the design effect can be achieved without respect to the vertical position of the torsion beam during the operation of the rear wheel suspension system.

According to a preferred embodiment of the present invention, a rear floor cross member is attached to an upper end of the vertical front wall of the spare tire pan and extending laterally across the vehicle body between the side frames, and a center floor extension extending longitudinally from a rear end of the front floor panel and opposing the torsion beam at a rear end thereof at a certain distance to even further increases the rigidity and energy absorbing capability of the rear vehicle body which are available at the time of a rear end collision. Preferably, the center floor extension aligns with a side wall of a floor tunnel formed centrally and extending longitudinally in the front floor panel to maximize such an effect. The center floor extension should be vertically positioned and dimensioned so as to oppose the torsion beam over an entire vertical stroke of the torsion beam whereby the design effect can be achieved without respect to the vertical position of the torsion beam during the operation of the rear wheel suspension system.

BRIEF DESCRIPTION OF THE DRAWINGS

Now the present invention is described in the following with reference to the appended drawings, in which:

FIG. 4 is a simplified side view showing the mode of deformation of the rear vehicle body according to the present invention at the time of a rear end collision.

DETAILED DESCRIPTION OF THE PREFERRED EMBODIMENTS

Figure 1:
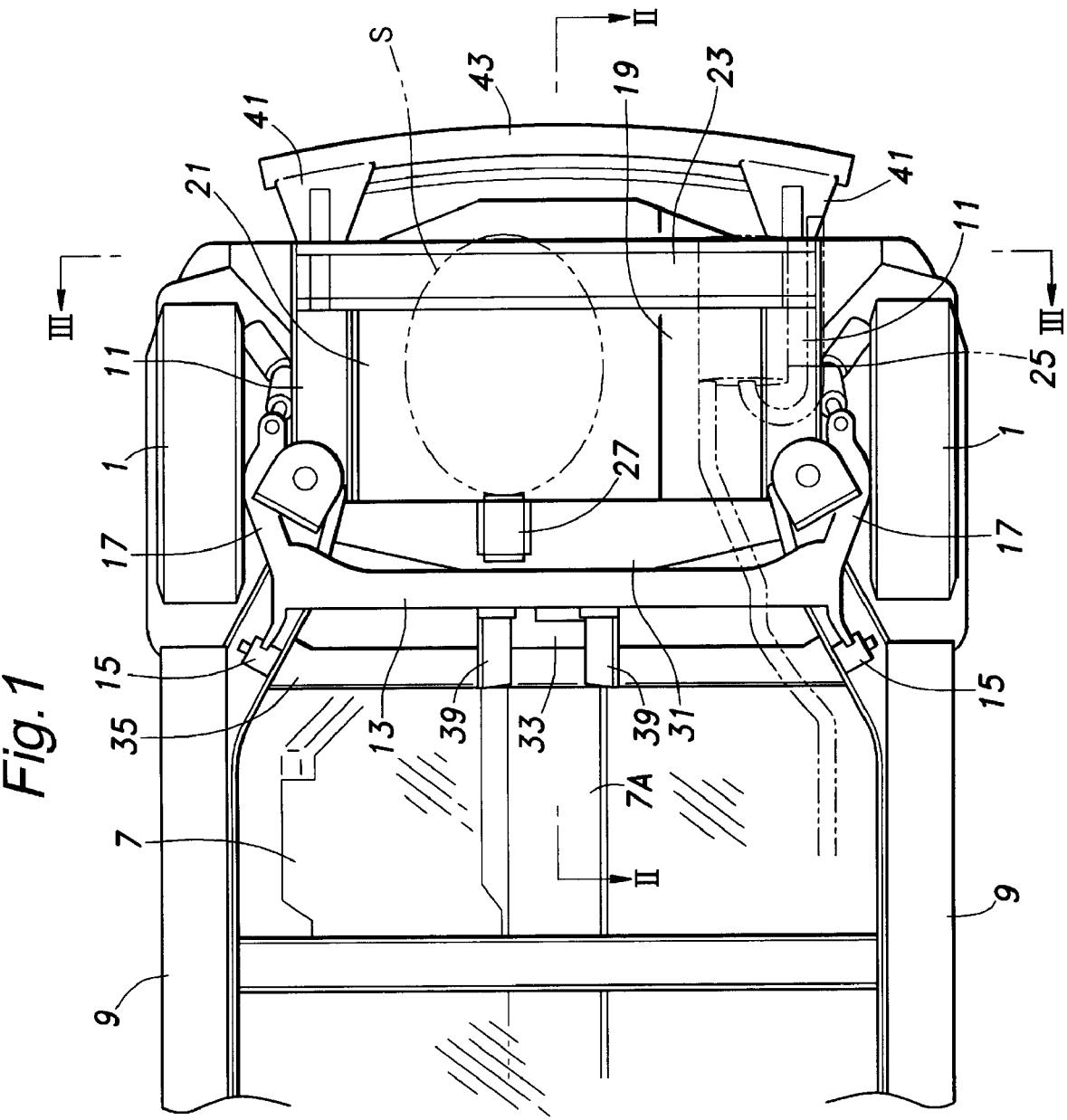
FIG. 1 is a fragmentary bottom view of a hatchback passenger vehicle having a rear vehicle body structure embodying the present invention.
Figure 2:
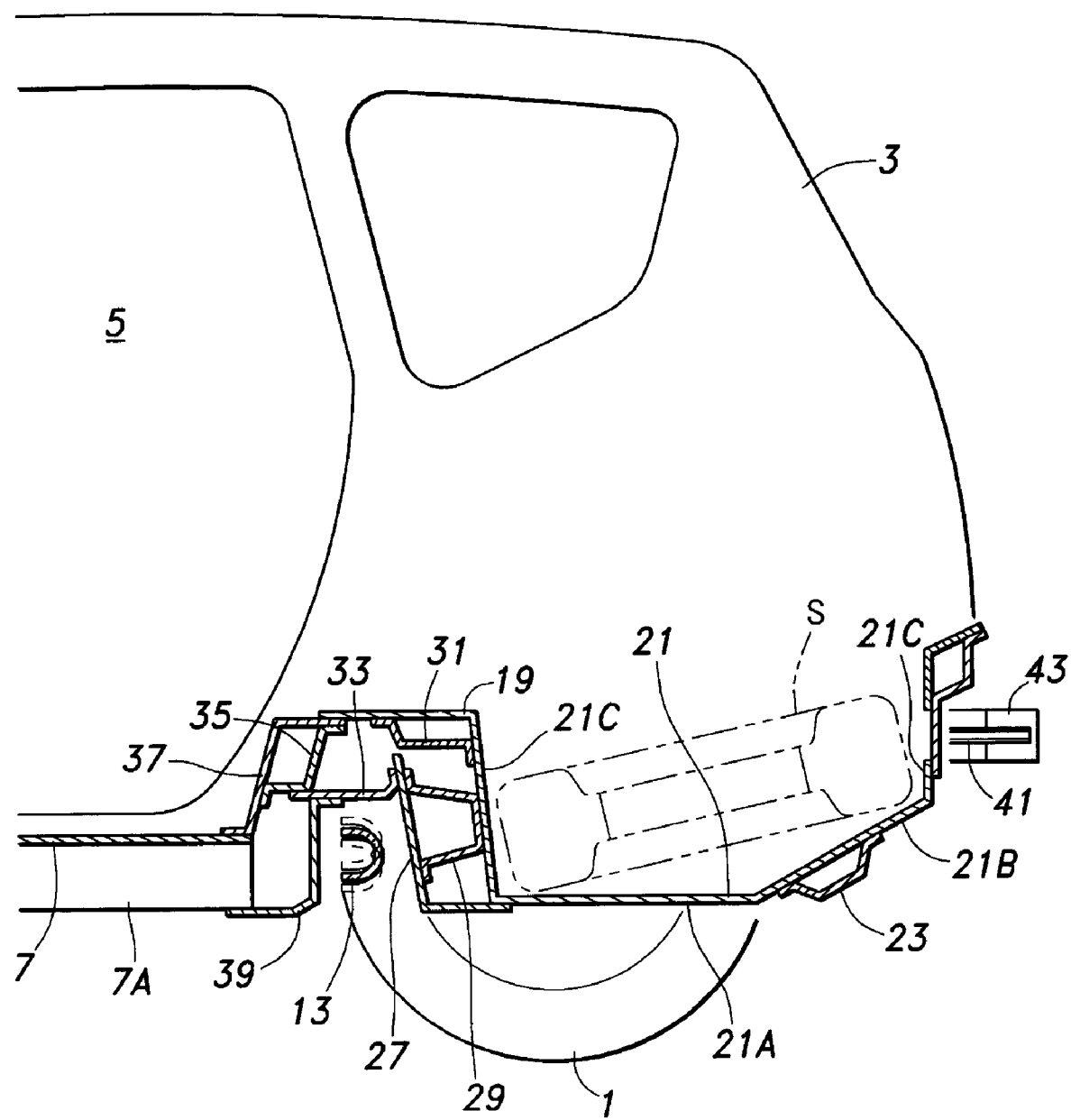
FIG. 2 is a sectional view taken along line II-II of FIG. 1.
Figure 3:
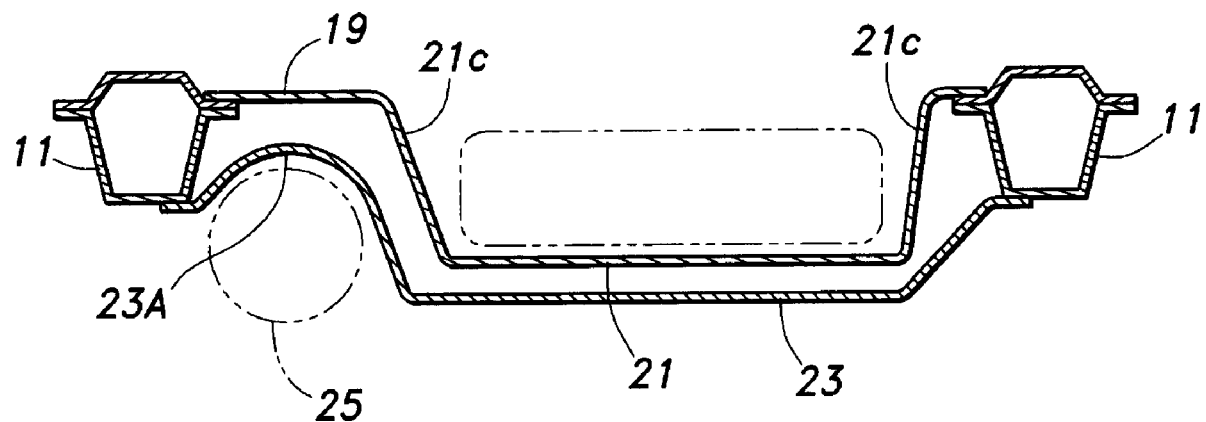
FIG. 3 is a sectional view taken along line III-III of FIG. 1.

FIGS. 1 to 3 show a hatchback passenger vehicle having a rear vehicle body structure embodying the present invention. These drawings show a pair of rear tires 1, a pair of side panels 3, a pair of rear side door openings 5 each defined in the corresponding side panel 3, a front floor panel 7 including a floor tunnel 7A extending centrally in the longitudinal direction and a pair of side sills 9 attached to either side edge of the front floor panel 7.

In the rear part of the vehicle body is provided a pair of rear side frames 11 extending in continuation from the rear ends of the corresponding side sills 9. In the illustrated embodiment, the front end of each rear side frame 11 extends obliquely so that the rear parts of the rear side frames 11 extend parallel to each other with a smaller spacing between them than the side sills 9. Each rear side frame 11 supports a corresponding pivot assembly 15 which is incorporated with a rubber bush and pivotally supports a base end of a trailing arm 17. Intermediate parts of the trailing arms 17 are connected to each other by a torsion beam 13. The rear wheels 1 are supported by the free ends of the corresponding trailing arms 17. In the illustrated embodiment, the torsion beam 13 has a U-shaped cross section with an open side thereof facing forward.

A rear floor panel 19 is attached to the upper sides of the rear side frames 11, and is formed with a spare tire pan 21 by recessing a part thereof laterally slightly offset from a central part thereof for receiving a spare tire S therein. In the spare tire pan 21, the spare tire S is placed with a side down orientation, and given with a slight rear up slant as best illustrated in FIG. 2. In the illustrated embodiment, the bottom wall of the spare tire pan 21 comprises a substantially horizontal front part 21A and a slanted rear part 21B, the slanted rear part 21B forming a kickup rear end of the vehicle body. The entire periphery of the spare tire S is surrounded by a vertical wall 21C of the spare tire pan 21.

A rear end cross member 23 is attached to the lower surface of the slanted rear part 21B of the spare tire pan 21 and extends laterally across the vehicle body. The rear end cross member 23 defines a closed cross section jointly with the rear floor panel 19. As illustrated in FIG. 3, the lateral ends of the rear end cross member 23 as well as those of the rear floor panel 19 are attached to the corresponding rear side frames 11. The rear end cross member 23 as well as the rear floor panel 19 is appropriately contoured (recess 23A) so as to avoid interference with a muffler 25.

The front vertical wall 21C of the spare tire pan 21 extends upward with a slight forward slant, and is bent forward at an upper end thereof to define a horizontal section. This bend is reinforced by a rear floor cross member 31 that forms a closed cross section jointly with the rear floor panel 19, and extends across the width of the vehicle body. A load transmitting member 27 is attached to the front side of the front vertical wall 21C of the spare tire pan 21 substantially centrally with respect to the spare tire S. The load transmitting member 27 is formed by stamp forming steel sheet, and comprises a main part extending substantially in parallel with the front vertical wall 21C in a spared apart relationship, a pair of side legs welded to the front side of the front vertical wall 21C and a bottom leg welded to the lower surface of the spare tire pan 21. The load transmitting member 27 is reinforced by a stiffener 29 similarly stamp formed and provided with a main part abutting the front side of the front vertical wall 21C and an upper and lower leg welded to the rear side of the main part of the load transmitting member 27. The load transmitting member 27 is positioned and dimensioned so as to oppose the torsion beam 13 over the entire vertical stroke thereof, and is enabled to transmit the impact of a rear end collision to the torsion beam 13 without regard to the vertical position of the torsion beam 13.

The front end of the rear floor panel 19 is elevated so as to be located above the torsion beam 13, and is connected to the rear end of the front floor panel 7 via a middle floor cross member 37 which is reinforced by a stiffener 35 for the middle floor cross member 37. The middle floor cross member 37 and stiffener 35 thereof jointly form a closed cross section. Thus, the front end of the rear floor panel 19 and middle floor cross member 37 connected to the rear end of the front floor panel 7 jointly define a slot having an open side facing downward that receives the torsion beam 13.

Additionally, a pair of center floor extensions 39 each extending longitudinally and align with a corresponding side wall of the floor tunnel 7A are fixedly attached to the rear end of the front floor panel 7. Each center floor extension 39 is positioned and given with a vertical dimension so as to oppose the torsion beam 13 over the entire vertical stroke thereof, and is enabled to support the torsion beam 13 when the rear end of the vehicle body is subjected to the impact of a rear end collision. Each center floor extension 39 is made of stamp formed sheet metal, and includes a sheet section that extends in the longitudinal direction.

To the rear ends of the rear side frames 11 is attached a rear bumper frame 43 via a rear bumper extension 41.

The mode of operation of the illustrated embodiment is now described in the following. When the vehicle is hit from behind by an oncoming vehicle 100 as shown in FIG. 4, the spare tire pan 21 collapses under the compressive force transmitted from the rear bumper frame 43 and rear end cross member 23. Because the spare tire S is received in the spare tire pan 21 in a slanted orientation, the impact from the rear end tends to cause the spare tire S to be raised upward around the front end thereof as indicated by letter X while the spare tire pan 21 undergoes a buckling deformation.

This rising movement of the spare tire S is effected in a reliable manner because the front end of the spare tire S is firmly supported by the front vertical wall 21C of the oil pan 21 which is reinforced by the rear floor cross member 31. In particular, the front vertical wall 21C is connected to the front floor panel 7 so as to jointly define an arch-like structure as seen from sideway, and the junction between the front floor panel 7 and rear floor panel 19 is reinforced by the closed cross section formed by the middle floor cross member 37 and stiffener 35 thereof so that the intrusion of the spare tire S into the passenger compartment can be avoided even when a considerable impact is applied.

Even if the impact is so strong that the arch-like structure collapses, the load transmitting member 27, torsion beam 13, center floor extensions 39 and center frame 33 are enabled to jointly support the front end of the spare tire S in a reliable manner. Thereby, the part of the vehicle body defining the passenger compartment is protected from excessive deformation. All of these components jointly provide a relatively large deformation stroke at the time of a rear end collision, and this significantly increases the energy absorbing capability of the rear vehicle body.

Because each center floor extensions 39 is so positioned and given with a vertical dimension as to oppose the torsion beam 13 over the entire vertical stroke thereof, and is thereby enabled to support the torsion beam 13 without fail when the rear end of the vehicle body is subjected to the impact of a rear end collision.

The slanted positioning of the spare tire S provides a large space for luggage, and avoids interference with a kickup portion or the slanted rear part 21B of the rear end of the vehicle body.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A rear vehicle body for a vehicle using a torsion beam suspension system, comprising:
   a pair of rear side frames extending longitudinally in a rear end of a vehicle body;
   a rear floor panel attached to the rear side frames and including a spare tire pan defining a recess for receiving a spare tire in a rear end up slanted orientation, the spare tire pan including a vertical front wall;
   a rear end cross member extending laterally between the rear side frames and attached to a rear part of the spare tire pan;
   a front floor panel defining a floor of a passenger compartment, and provided with a raised rear end connected to an upper end of the vertical front wall of the spare tire pan so that a laterally extending slot is defined between the vertical front wall and raised rear end of the front floor panel, wherein the slot receives a torsion beam of the torsion beam suspension system; and
   a center floor extension extending longitudinally from a rear end of the front floor panel and opposing the torsion beam at a rear end thereof at a certain distance.

2. The rear vehicle body structure according to claim 1, wherein the center floor extension aligns with a side wall of a floor tunnel formed centrally and extending longitudinally in the front floor panel.

3. The rear vehicle body structure according to claim 1, wherein the center floor extension is vertically positioned and dimensioned so as to oppose the torsion beam over an entire vertical stroke of the torsion beam.

* * * * *